Patented May 7, 1940

2,199,654

UNITED STATES PATENT OFFICE 2,199,654

PROCESS OF TREATING IRON ORE

Kenneth M. Simpson, New York, N. Y.

No Drawing. Application February 7, 1939,
Serial No. 255,148

6 Claims. (Cl. 75—1)

This invention relates to a process of treating iron ores, and more particularly to a process of removing nickel or chromium or both from an iron ore containing the same so as to enable the iron ore to be smelted into iron suitable for making steel.

The invention is particularly applicable to the ore from the well-known iron ore deposits in Cuba. These iron ores have heretofore been employed to a very slight extent only, as the ore contains appreciable amounts of nickel and chromium which interfere with the production of standard useful grades of pig iron in a blast furnace. As large quantities of these ores occur in Cuba and are of such a nature that the ore can be mined and handled cheaply, attempts have been made to smelt these ores "as is" and then subject the resulting pig iron, which is high in chromium and high in nickel, to special treatment in other furnaces, particularly open hearth furnaces. The results of these operations have not enabled steel makers to employ the Cuban ores except for very special purposes, and no large scale operations have developed therefrom.

An object of the present invention is to treat such ores as the Cuban ores referred to prior to smelting to remove a large percentage of the nickel and chromium so as to render the treated ores suitable for practical use in the ordinary blast furnace.

Another object of the invention is to provide a process of removing chromium and nickel from iron ores containing the same so as to recover nickel and valuable chromium concentrates as well as render the ore suitable for smelting operations.

In accordance with the present invention, the nickel is removed from the ore by combining the same with carbon monoxide to form nickel carbonyl and separating the nickel carbonyl in vapor form from the ore. The chromium is removed from the ore on slime treatment concentrating tables. The chromium is preferably removed prior to treatment for removing nickel, but these steps may be performed in the reverse order.

The chromium occurs in the ore in the form of small grains of chromite mineral $FeCr_2O_4$, which are hard, tough, resistant particles. I have found that such grains can be largely removed from the ore mass by grinding the ore to finely divided form, for example, until 80% of the ore passes a 200 mesh screen; then suspending the ore in a suitable amount of water, for example 2½ parts of water to one part of ore; then passing the aqueous suspension over suitable concentrating tables of the type known as slime tables which permits concentration of the chromite particles and allows the iron ore to pass over the table as a slime. The finely divided iron ore is then settled or thickened or otherwise recovered from the aqueous suspension. By this method the chromium content of the ore may be reduced from 1 to 2% to .2 to .4%.

In the preferred process, the ore is then subjected to treatment for removing the nickel. The ore is first selectively reduced with reducing gases at a temperature between 350 and 550° C. to convert nickel oxide to nickel preferentially to the conversion of iron oxide to iron and is then cooled and treated with carbon monoxide at a temperature between 40 and 80° C. to remove the nickel as gaseous nickel carbonyl, which is subsequently decomposed by subjecting the same to temperatures above 200° C., with or without prior purification, to form substantially pure nickel. The reduction, cooling and carbon monoxide treatments of the ore are carried out in closed chambers out of contact with the air. The decomposition of the nickel carbonyl is likewise carried out in a closed chamber and the carbon monoxide resulting from the decomposition is again employed in treating the ore to form nickel carbonyl. By the step above described, ores containing between 1 and 2% nickel can be treated to reduce the nickel content to 0.2% to 0.33% nickel.

As stated before, the removal of the nickel from the ore can be carried out prior to the removal of chromium. In this case it is not always necessary for the recovery of nickel to grind the Cuban ore, as this ore occurs in relatively finely divided form and the nickel oxide is usually very finely divided. If the chromium is to be subsequently removed, however, it is preferable to grind the ore prior to removing the nickel, as the nickel can thereby be more easily removed.

While I have disclosed the preferred embodiment of my invention, it is understood that the details thereof may be varied within the scope of the following claims.

I claim:

1. The process of removing nickel and chromium from an iron ore containing the same which comprises a chromium separation operation including passing said ore over slime tables while in finely divided form to separate minerals containing chromium from said ore, and a nickel separation operation including converting the nickel of said ore to metallic form while leaving the iron substantially all in oxide form, treating the ore with carbon monoxide to form nickel carbonyl vapors, and separating said vapors from said ore, said operations being carried out in any desired order.

2. The process of removing nickel and chromium from an iron ore containing the same which comprises removing chromite particles from the ore by passing the same over slime tables while in finely divided form and suspended in water, whereby the chromite particles form a concentrate and the iron ore passes over the table, converting nickel oxide in said ore to metallic nickel while retainig the iron substantially all in oxide form, treating the same with carbon monoxide to form nickel carbonyl and separating said nickel carbonyl from said ore.

3. The process of removing chromium and nickel from an iron ore containing nickel and iron oxides and chromium in the form of chromite which comprises reducing said ore to finely divided form, separating chromite particles from said iron ore on slime tables, converting said nickel oxide to nickel carbonyl while retaining the iron substantially all in oxide form and separating said nickel carbonyl from said ore.

4. The process of removing nickel and chromium from an iron ore containing iron and nickel oxides and chromium in the form of chromite which comprises reducing said ore to finely divided form, suspending said ore in a suitable amount of water, separating chromite particles from said iron ore by passing the same over slime tables, subjecting the separated ore to treatment with a reducing gas at an elevated temperature to selectively reduce nickel oxide to metallic nickel while retaining a major portion of the iron in oxide form, treating the reduced ore with carbon monoxide in a closed chamber at a temperature between 40 and 80° C. to form nickel carbonyl, and separating said nickel carbonyl from said ore to produce an ore having less than about .33% nickel and .4% chromium.

5. The process of removing chromium and nickel from iron ore containing iron and nickel oxides and chromium in the form of chromite which comprises a nickel separation operation including reducing said ore to finely divided form, removing nickel from said ore by converting the nickel oxides to nickel carbonyl in vapor form while retaining a major portion of the iron in oxide form and separating the vapor from said ore and a chromium separation operation including removing the chromite particles from said ore by suspending the ore in water and passing the same over slime tables in order to produce an improved iron ore for the production of iron suitable for making steel, said operations being carried out in any desired order.

6. The process of removing nickel and chromium from an iron ore containing nickel oxide and chromium in the form of chromite, which comprises, grinding said ore to finely divided form, subjecting the ground ore to reduction at a temperature between 350 and 550° C. to reduce nickel oxide to metallic nickel while retaining a major portion of the iron in oxide form, cooling the reduced ore and subjecting the same to treatment with carbon monoxide at a temperature between 40 and 80° C. to form nickel carbonyl vapors, separating said vapors from said ore, suspending the separated ore in water and passing the same over slime tables to separate said chromite particles from said iron ore.

KENNETH M. SIMPSON.